(12) United States Patent
Kazmi et al.

(10) Patent No.: US 8,660,569 B2
(45) Date of Patent: Feb. 25, 2014

(54) SEMI-DISTRIBUTED, QUALITY-OF-SERVICE-BASED SCHEDULING PROTOCOLS, WITH MINIMUM CONTROL PLANE SIGNALING

(75) Inventors: Muhammad Kazmi, Bromma (SE); Gabor Fodor, Hasselby (SE); Walter Muller, Upplands Vasby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 757 days.

(21) Appl. No.: 12/933,198

(22) PCT Filed: Oct. 7, 2008

(86) PCT No.: PCT/SE2008/051140
§ 371 (c)(1),
(2), (4) Date: Sep. 17, 2010

(87) PCT Pub. No.: WO2009/116913
PCT Pub. Date: Sep. 24, 2009

(65) Prior Publication Data
US 2011/0021232 A1    Jan. 27, 2011

Related U.S. Application Data

(60) Provisional application No. 61/038,198, filed on Mar. 20, 2008.

(51) Int. Cl.
*H04W 72/00* (2009.01)
(52) U.S. Cl.
USPC ............................ 455/450; 455/509; 370/329

(58) Field of Classification Search
USPC ............................ 455/450–453, 509; 370/329
See application file for complete search history.

(56) References Cited

U.S. PATENT DOCUMENTS 6,418,136 B1    7/2002  Naor et al.
2001/0036113 A1*  11/2001  Jurgensen et al. ............ 365/200

FOREIGN PATENT DOCUMENTS

| | | |
|---|---|---|
| EP | 0817521 A2 | 1/1998 |
| EP | 1033846 A1 | 9/2000 |
| EP | 1143755 A1 | 10/2001 |
| WO | 97/19525 | 5/1997 |

OTHER PUBLICATIONS

Zhang, Y. et al. "QoS-Aware Multichannel Random Access in CDMA2000 Nx EV-DO Systems." 65th IEEE Vehicular Technology Conference (VTC2007-Spring), Apr. 1, 2001, pp. 1116-1120.

* cited by examiner

*Primary Examiner* — Raymond Dean
(74) *Attorney, Agent, or Firm* — Coats and Bennett, P.L.L.C.

(57) ABSTRACT

Methods and apparatus for scheduling link resources in a wireless communication system are disclosed. In an exemplary method, a first scheduling policy vector, or SPV, is generated, the SPV including scheduling elements that prescribe a probability of use for each of several corresponding quantities of link resources. In some embodiments the link resources are LTE resource blocks. The SPV is transmitted to a mobile terminal for use in determining a quantity of link resource units to be scheduled in at least a first transmission time interval. The SPV may be transmitted along with a scheduling window parameter that specifies a period of applicability for SPV.

43 Claims, 7 Drawing Sheets

SEMI-DISTRIBUTED, QUALITY-OF-SERVICE-BASED SCHEDULING PROTOCOLS, WITH MINIMUM CONTROL PLANE SIGNALING

TECHNICAL FIELD

The present invention generally relates to wireless communication systems, and particularly relates to scheduling of resources in such systems

BACKGROUND

New wireless communications standards developed by the $3^{rd}$-Generation Partnership Project, such as the High Speed Packet Access (HSPA) and Long Term Evolution (LTE) standards, allow an unprecedented flexibility in the scheduling of transmission resources among mobile terminals served by a cellular base station. In these systems, the packet scheduler plays a crucial role in providing the appropriate quality of service (QoS) for a variety of different service classes while simultaneously maintaining high resource utilization. As a result, the design of efficient and QoS-aware scheduling algorithms has received much attention from a research perspective. One particularly promising class of QoS-aware schedulers, for example, makes use of frequency-selective and time-selective propagation channel characteristics by exploiting "opportunism."

In an LTE context, where Orthogonal Frequency-Division Multiple Access (OFDMA) and closely-related Single-Carrier Frequency Division Multiple Access (SC-FDMA) techniques are used to facilitate fine-grained assignment of link resources to individual mobile terminals, a fundamental design assumption for a centralized packet scheduler approach is that there is a cell-wise centralized scheduling entity (e.g., located in the base station, known in LTE as the evolved Node B or "eNodeB") that ensures that intra-cell collisions do not occur. That is, the centralized packet scheduler ensures that multiple mobile stations in the cell do not use the same time-frequency resources. Indeed, minimizing or even eliminating intra-cell interference is instrumental in ensuring high spectrum efficiency and providing high throughput.

From a system design and standardization perspective, significant efforts have been dedicated to developing the necessary control plane support to allow the central scheduling entity and the communicating mobile terminals to allocate time and frequency resources in such a manner that appropriate QoS is maintained and resources are well utilized. The design of the control protocols (which manage scheduling requests and grants) generally must address the issues of keeping the control plane traffic reasonably low, supporting a high granularity of resource sharing, preferably both in time and frequency, and ensuring low delay for managing scheduling requests and grants. In state-of-the-art schedulers, simultaneously meeting these three basic requirements is challenging.

An alternative to centralized scheduling approaches is to provide a distributed mechanism for controlling the access of competing mobile stations to the communication medium (that is, time, frequency, power, code and other resources). Distributed scheduling or distributed medium access control (MAC) mechanisms are well known and in use in several wireless and wired systems. One example is the classic ALOHA protocol. Such solutions are part of today's cellular networks, for example, in the so-called random access channel (RACH) and (uplink) common packet channels (CPCH), and have been studied for user data transmissions employing distributed MAC.

To minimize collisions, a base station employing one of these distributed mechanisms broadcasts an access probability with which a mobile terminal should transmit on the random access channel or the associated preamble sequence. For example, a persistency value is used in UMTS to determine whether or not a RACH transmission is initiated in a particular transmission time interval. The physical RACH resources may be divided between different service classes in order to provide different priorities of RACH usage. However, since random access is used to acquire initial access to the network, this approach does not take into account user-application-specific QoS requirements and does not provide any means to ensure the fulfillment and QoS differentiation of user plane connections. On the other hand, the control plane overhead is minimized in this approach, since per-terminal request and grant messages are not necessary.

Refined multiple access schemes have been proposed in the context of wireless communications systems. One example is the Packet Reservation Multiple Access (PRMA) protocol. This scheme is a refinement of pure random access solutions. In this method, after a successful random access, the UE (user equipment) retains dedicated or shared resources for a certain period of time. The drawback is that resources are wasted if not fully used during the time window.

Multi-user Multiple-Input Multiple-Output (MU-MIMO) systems create multiple data streams, separated in the spatial domain, using multiple transmit and receive antennas. The spatially separated multiple data streams may use the same time and frequency resource without causing interference to one another. Thus, MU-MIMO technology can be viewed as a means for avoiding time- and frequency domain (intra- or inter-cell) collisions.

Centralized packet scheduling and random access with minimum control plane support represent two extreme cases in the sense that the former eliminates intra-cell collisions, at the expense of control plane complexity, while the latter regulates collisions indirectly, via admission and load control mechanisms, while using a simplified control plane. Existing cellular systems employ both centralized schedulers and random access channels for different traffic types and different purposes. In these systems, the two approaches exist side by side, as two distinct medium access control (MAC) mechanisms. However, cellular networks that operate with high spectrum efficiency and provide service for a mixture of best effort and QoS enabled services typically employ centralized schedulers for user data traffic. Indeed, this is the case for the evolved Universal Terrestrial Radio Access (E-UTRA), the air interface for LTE systems, in which a rigorous control plane support ensures that intra-cell collisions are eliminated.

This approach creates several unresolved problems in E-UTRA. One problem is excessive control plane complexity and control plane traffic overhead—managing the scheduler requests and grants is a complex task and creates overhead in the carried total traffic through the radio interface. This is exacerbated in LTE systems because of the fine granularity, both in time and frequency, with which the resources may be scheduled. A second problem is increased user plane delay, which occurs because a mobile terminal must request a scheduling resource and await the grant from the centralized scheduling entity before it can access the channel for packet data transmission.

In short, improved medium access control mechanisms are needed to ensure appropriate levels of quality-of-service and ensure high resource utilization in systems where resources may be scheduled with fine granularity. Minimizing the control plane overhead, both in terms of control messages and induced delay, is also desirable.

SUMMARY

Various embodiments of the present invention distribute access probability parameters, with fine granularity, from a centralized entity in a base station to mobile terminals served by that base station. In some embodiments, these access probabilities prescribe for a plurality of frequency channels or other resource units the probability that a particular resource unit (e.g. OFDM sub-carrier) or a particular quantity of resource units, or both, can be taken into use by a particular mobile terminal. The access probabilities thus form an access probability vector that controls the overall access to each available frequency resource, providing a means to trade off collision probabilities with long term resource utilization. The disclosed systems thus represent a hybrid solution, utilizing aspects of both completely centralized and completely distributed systems, operating in such a way that the fine granularity of resource partitioning is preserved and QoS is maintained.

In an exemplary method for allocating link resources in a wireless communication system, according to some embodiments of the invention, a first scheduling policy vector (SPV) is generated, the SPV including scheduling elements that prescribe a probability of use for each of several corresponding quantities of link resources. Thus, for example, a first scheduling element might indicate the probability that a single LTE resource block should be used in a given transmission time interval, while a second scheduling element indicates the probability that two resource blocks should be used, and so on. After the SPV is generated, it is transmitted to a mobile terminal for use in determining a quantity of link resource units to be scheduled in at least a first transmission time interval. In some embodiments, the SPV may be transmitted along with a scheduling window parameter that specifies a period of applicability for SPV, so that it may be applied by the mobile terminal in scheduling several transmission time intervals.

In other embodiments of the invention, each scheduling element of the SPV prescribes a probability of use for a specific corresponding link resource unit. In some of these embodiments, the scheduling elements may define an absolute probability of use for the corresponding link resource, for use by a receiving mobile terminal in selecting specific link resource units for scheduling in the transmission time interval. In other embodiments, one or more of the scheduling elements of the SPV may instead define conditional probabilities of use for the corresponding link resource units. In these embodiments, the conditional probabilities specified by the SPV may be used in conjunction with resource priority elements that define a priority order for the link resource elements. The conditional probabilities in this case may indicate a probability that a given link resource unit is used, given that all higher priority link resource units have already been taken into use.

In still other embodiments of the invention, a method of allocating link resources may include the generation of a resource unit probability vector in addition to a first scheduling policy vector. In these embodiments, the resource unit probability vector comprises a plurality of resource elements, each prescribing a relatively probability of use for a specific corresponding resource unit. The resource unit probability vector is transmitted to a mobile terminal along with a scheduling policy vector that defines probabilities of use for various quantities of link resource units. Thus, in some embodiments of the invention, the number of resource units likely to be scheduled by a mobile terminal and the particular resource units likely to be scheduled by that mobile terminal are regulated independently, using a scheduling policy vector and a resource unit probability vector.

In some embodiments of the invention, the elements of the scheduling policy vector are calculated as a function of the number of mobile terminals served by the scheduling base station and a target probability for collisions between mobile terminal transmissions. In some embodiments, the scheduling elements are further calculated as a function of a quality-of-service requirement for a particular mobile terminal or a group of mobile terminals.

In various embodiments of the invention, scheduling policy vectors are transmitted to one or more mobile terminals at a particular frequency, so that the vectors may be periodically updated. In some embodiments, the frequency of transmission may be determined as a function of loading conditions in the cell of interest. For instance, scheduling vectors may need to be updated more frequently in a heavily loaded cell.

Embodiments of the present invention further include various base stations configured to generate and transmit scheduling policy vectors according to the methods described above and variants thereof. Further embodiments include mobile terminals configured to utilize the scheduling policy vectors, and corresponding methods. For instance, an exemplary mobile terminal according to some embodiments of the invention comprises a radio transceiver and a scheduling unit, wherein the scheduling unit is configured to receive, via the radio transceiver, a scheduling policy vector such as any of those described above. In some embodiments, the scheduling unit is further configured to determine, based on the scheduling policy vector, a quantity of link resources to be used in a particular transmission time interval, and to schedule one or more link resource units according to the determined quantity. In some embodiments, the scheduling unit is further configured to use a resource unit probability vector, received via the radio transceiver, to select particular link resource units for scheduling. In some of these embodiments, the scheduling unit may be configured to select one or more particular link resource units based on resource priority elements and resource probability elements included in the scheduling policy vector and an accompanying resource priority vector, respectively, where each resource priority element indicates a priority of use for a corresponding link resource unit, and where each of the resource probability elements indicates a conditional probability that the mobile terminal uses the corresponding link resource unit in a given transmission time interval, given that all higher-priority link resource units have already been scheduled by the mobile terminal.

Of course, the present invention may be carried out in other ways than those specifically set forth above without departing from the scope of the invention as defined by the appended claims. Those skilled in the art will recognize further variants of the present invention upon reading the below detailed description and viewing the attached drawings.

DETAILED DESCRIPTION

Figure 1:
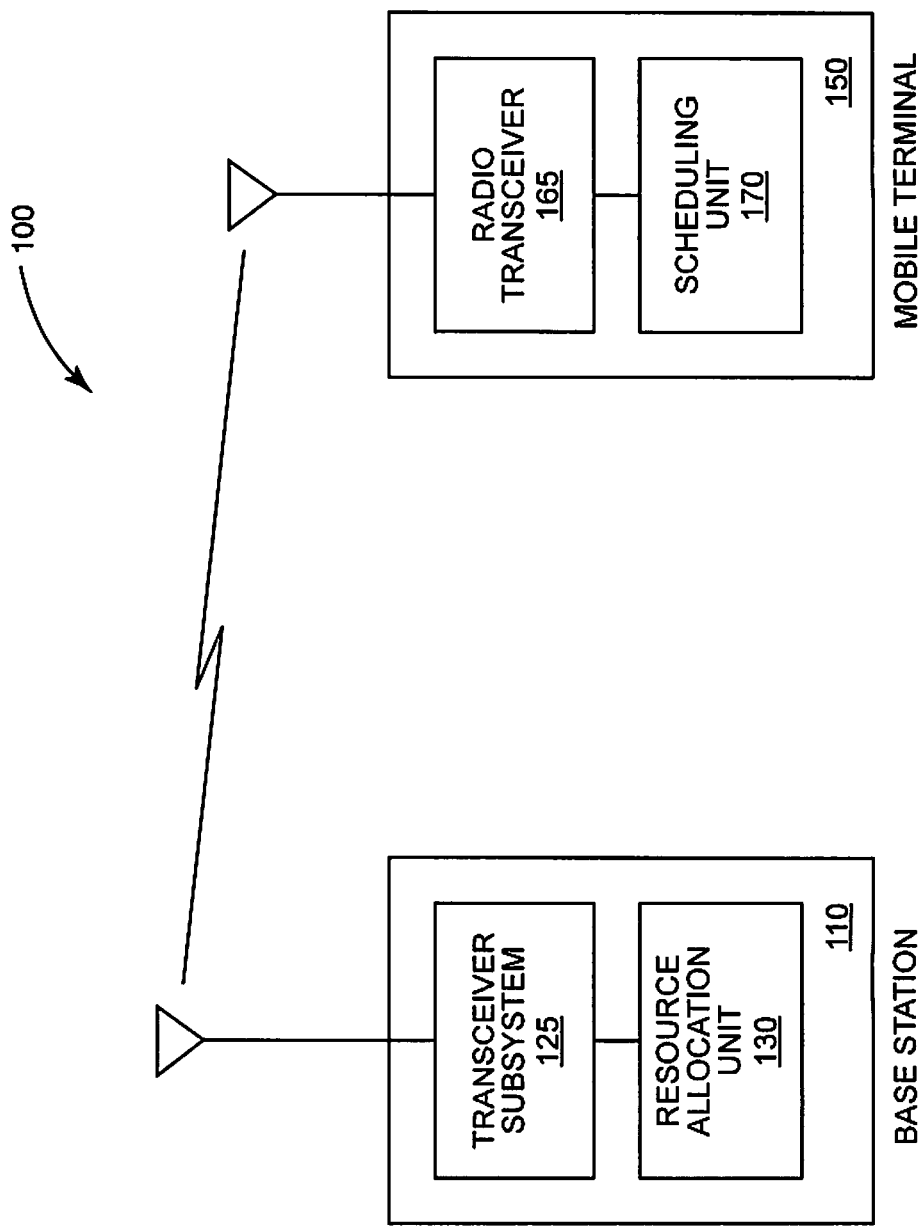
FIG. 1 is a block diagram illustrating a wireless communication system comprising a base station and mobile terminal according to some embodiments of the present invention.

FIG. 1 provides a simplified view of a wireless communication system 100, including a base station 110 and a mobile terminal 150. Of course, those skilled in the art will appreciate that a single base station 110 may provide wireless communication services to several mobile terminals at a time. Further, base station 110 may be but one of many base stations in a network covering a larger geographic regions. Various wireless communication technologies are in use today; most are standardized, such as the family of wireless telecommunication technologies specified by the $3^{rd}$-Generation Partnership Project (3GPP). For the purposes of this disclosure, only those details necessary to a full understanding of the present invention are discussed, as other details of wireless network communications, radio transceiver designs, and the like, are well known.

In several embodiments of the present invention, base station 110, which may be an evolved Node-B, or eNodeB, according to the Long Term Evolution (LTE) specifications under development by 3GPP, includes at least a transceiver subsystem 125 and resource allocation unit 130. The resource allocation unit 130 determines uplink scheduling data that it transmits to mobile terminals served by base station 110, including mobile terminal 150, using transceiver subsystem 125. The uplink scheduling data is received by mobile terminal 150, via radio transceiver 165, and used by scheduling unit 170 to determine the quantity of resources that the mobile terminal may use in a particular transmission time interval, as well as the particular resources to use, in some cases. Mobile terminal 150 may comprise, in some embodiments, a cellular handset, PC card, wireless module, or other device, configured for wireless communication according to the LTE specifications and/or according to one or more other wireless communication standards supported by base station 110.

Those skilled in the art will appreciate that transceiver subsystem 125 and radio transceiver may be conventional subsystems configured according to one or more wireless communication standards. Because the details of these subsystems are not necessary to a full understanding of the present invention, these details are not provided here. Similarly, resource allocation unit 130 and scheduling unit 170 may comprise one or more programmable microprocessors, microcontrollers, or the like, provided with appropriate software and/or firmware stored in computer memory. Resource allocation unit 130 may be implemented at a base station, network controller, or other network entity, and may be co-located with various other network control functions in several embodiments. Similarly, scheduling unit 170 may be implemented using one or more of the same processors used to carry out other communication protocol function, user interface functions, and the like.

In some embodiments of the present invention, the uplink scheduling data generated by the resource allocation unit 130 of base station 110 may take the form of a scheduling policy vector (SPV) that is distributed to one or more served mobile terminals. A scheduling policy vector may be customized for a single mobile terminal 150 or for a group of mobile terminals, or may be provided to all mobile terminals served by the base station 110. Generally speaking, an SPV includes several individual scheduling elements, each corresponding to a particular quantity of link resources or to a specific link resource. In some embodiments, the value of each scheduling element provides the receiving mobile terminal 150 with an indication of a probability that the corresponding quantity of link resources should be used at a particular scheduling instance, i.e., for a particular transmission time interval. In an LTE system, the scheduling elements of an SPV might correspond to quantities of resource blocks, where a resource block comprises a time-frequency resource allocation of twelve adjacent OFDMA (or SC-FDMA) subcarriers and fourteen consecutive symbols. However, those skilled in the art will appreciate that resources might be assigned with more or less granularity than this in LTE systems or other systems.

Thus, in several embodiments of the present invention, a base station 110 generates a scheduling policy vector that contains N+1 scheduling elements, each indicating the probability that the receiving mobile terminal 150 takes into use k link resource units (e.g., LTE resource blocks) at a particular scheduling instance, where $0 \le k \le N$. Of course, the probability associated with each link resource quantity is less than one, and the sum of the probabilities indicated by the SPV's elements add up to one. In some embodiments, the base station also distributes, along with the SPV, a parameter specifying a period of applicability during which the mobile terminal 150 must adhere to the SPV. This parameter may specify, for example, a number of transmission time intervals to which the SPV applies, a length of time over which the SPV applies, or an expiration time. After the mobile terminal 150 receives the SPV, its scheduling unit 170 makes an autonomous decision, in each transmission time interval, with regards to the quantity of link resources (e.g., number of LTE resource blocks) to use. After deciding how many resource units to use, the scheduling unit 170 further makes an autonomous decision as to which particular resource units out of the available ones that it uses to transmit data.

Figure 2A:
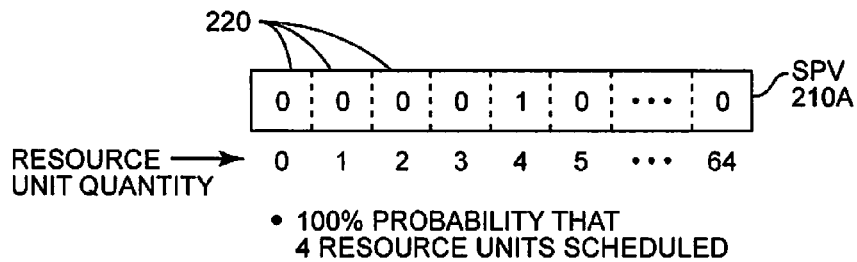
FIGS. 2A-2C illustrate examples of a scheduling policy vector according to some embodiments of the present invention.
Figure 2B:
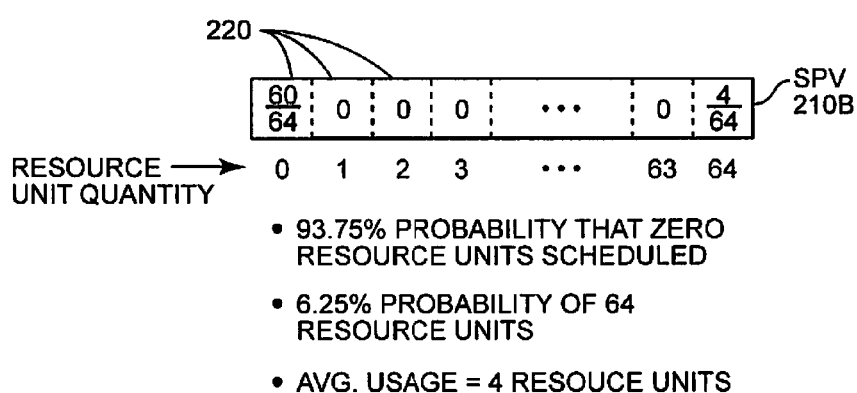
Figure 2C:
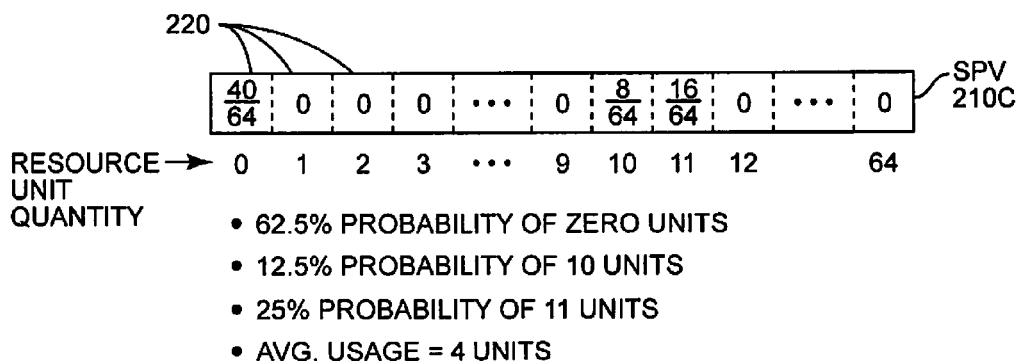

FIGS. 2A-2C illustrate several examples of possible scheduling policy vectors of the type discussed above. These examples demonstrate three distinct scheduling policies, illustrating the scheduling flexibility provided by the techniques described herein. Suppose there are N=64 resource units (e.g., subcarriers or resource blocks) in a frequency division system, and that the targeted mobile station has a peak data rate requirement for uplink data transmission corresponding to four resource units. (For the sake of this example, a fixed modulation and coding scheme is assumed, although this is of course not necessarily the case.) Suppose further that there are six users currently served by base station 110, and thus sharing the available uplink resources.

A first scheduling policy vector, SPV 210A, is illustrated in FIG. 2A. SPV 210A effectively emulates a dedicated channel scheduling policy. SPV 210A includes 65 scheduling elements 220, each indicating a probability that a corresponding quantity of resource units (0 . . . 64) should be used. SPV 210A includes only a single non-zero scheduling element—a "1" at the fifth position in the vector, indicating a probability of 1 (or 100%) that four scheduled resource blocks, should be used in the one or more transmission time intervals to which SPV 210A applies. (Those skilled in the art will appreciate that the illustrative SPV vector values given herein are probability values ranging from 0 to 1. In practice, of course, these values may be scaled, normalized, and/or otherwise encoded, for convenience in processing and/or transmitting.)

A mobile terminal that receives SPV 210A will schedule four resource blocks, meaning that the mobile terminal essentially has a dedicated channel. If each of the six mobile terminals in this example receive SPV 210A, then all of the mobile terminals are certain to schedule a transmission in each transmission time interval. However, each only takes into use four resource units. SPV 210A only determines how many resource units are utilized. By itself, the scheduling policy vector does not determine which particular resource units are to be used. Thus, with this scheduling policy, collisions between individual mobile terminal transmissions may occur in the frequency domain, at a resource unit granularity.

SPV 210B, pictured in FIG. 2B, illustrates a distinct scheduling policy, this time emulating a time-division multiple access (TDMA) scheduling policy. The first scheduling element 220 of SPV 210B, corresponding to zero resource units, includes a value of $60/64$, indicating a 93.75% likelihood that the receiving mobile terminal will schedule no resources at all in a given transmission interval. The final scheduling element 220, corresponding to 64 resource units, indicates a 6.25% probability that all 64 resource units should be scheduled. Under this all-or-nothing scheduling policy, SPV 210B prescribes that the mobile terminal should either not transmit at all (i.e., schedule zero link resource units) or that it should transmit using all available resource units, albeit with a relatively low probability. If all the mobile terminals served by a base station receive the same or similar SPV, then the system would essentially operate in a TDMA fashion. However, because the transmission times are not strictly scheduled, a collision may occur when two or mobile terminals happen to schedule themselves at the same time. In this case, such a collision would occur across all of the resource units.

Those skilled in the art will appreciate that the average quantity of scheduled resources is identical for each of the dramatically different scheduling policies prescribed by SPV 210A and SPV 210B. In the first case, each mobile terminal is certain to schedule four resource units at each transmission interval. Thus, the average scheduled quantity for each mobile terminal is four. In the second case, each mobile terminal schedules 64 resource units occasionally—6.25% of the time. Again, the average scheduled quantity is four. Those skilled in the art will appreciate that a variety of other scheduling policies, lying between these two extremes, are possible, while still maintaining a desired average scheduled quantity. Thus, the average scheduled quantity may be controlled independently of the desired scheduling policy. One such "hybrid" scheduling policy is illustrated in FIG. 2C.

In FIG. 2C, SPV 210C includes several non-zero scheduling elements 220. A value of 62.5% at the first position indicates a 62.5% probability that no resource units are scheduled in a particular time interval. A value of $8/64$ in the eleventh position indicates a 12.5% probability that 10 units should be scheduled. Similarly, a value of $16/64$ in the twelfth position indicates a 25% probability that 11 units are to be scheduled. The average quantity of scheduled resources is thus:

$$0(0.625)+10(0.125)+11(0.25)=4,$$

just as with the policies prescribed by SPVs 210A and 210B. However, the actual behavior of the mobile terminal at any given scheduling interval is different. Somewhat more than half the time, no units are scheduled. At other intervals, either 10 or 11 units are scheduled. If all the mobile terminals in a given cell receive this SPV, then in a given transmission interval there might be collisions in the time and frequency domains. Accordingly, with the above three SPV types, and variations thereof, a base station's resource allocation unit can generate scheduling policy vectors that establish a nearly arbitrary distribution of total occupied channels and collision probabilities.

Figure 3:
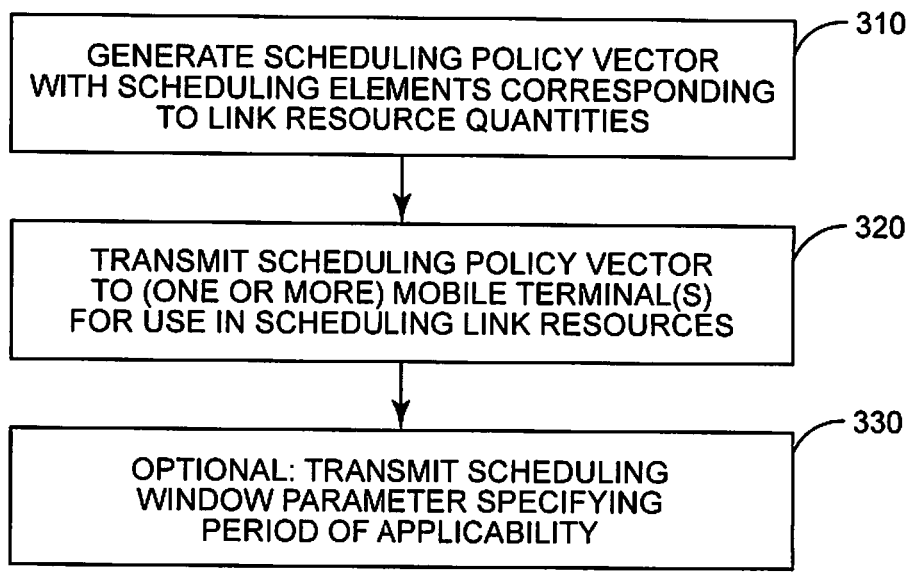
FIG. 3 is a logic flow diagram illustrating an exemplary method for allocating link resources in a wireless communication system.

An exemplary method of allocating link resources in a wireless communications system is thus illustrated in the process flow diagram of FIG. 3. The pictured process begins at block 310, with the generation of a scheduling policy vector having a plurality of scheduling elements, each scheduling element in this embodiment prescribing a probability of use for a corresponding quantity of link resources. Although the example SPVs described above included a scheduling element 220 corresponding to all possible quantities of resource units (in the example system, ranging from zero to 64 resource units), this is not necessarily the case in all embodiments. For instance, some embodiments might employ a truncated SPV, including elements corresponding to quantities of zero resource units up to a fraction, e.g., one-fourth, of all the available resource units. This scheme might be used in a system where a mobile terminal is never allowed to use more than a pre-determined fraction of the available resources, in which case the truncated SPV may be the norm. In other instances, the length of the SPV might vary from one instance to another. For example, some systems might truncate the SPV after the last non-zero entry. Other systems might also employ an SPV which includes fewer scheduling elements than all possible quantities of resources. For example, some systems might generate an SPV with scheduling elements corresponding to even quantities of resource units (0, 2, 4, etc.), or according to some other pre-determined mapping of scheduling elements to resource unit quantities.

In any event, the generated SPV is transmitted, as shown at block 320, to at least one mobile terminal for use in scheduling uplink transmission resources for one or more upcoming transmission intervals. As was noted above, an SPV in some embodiments or under some circumstances may be customized for a particular mobile terminal or group of mobile terminals, in which case the SPV may be addressed only to that mobile terminal or group. In other cases, a single SPV may be applicable for all mobile terminals served by a given base station, in which case the SPV is transmitted to these additional mobile terminals as well.

In some systems, an SPV received by a mobile terminal may be used for scheduling resources for an indefinite period of time, such as until a new SPV is received. In other systems, however, an SPV may be transmitted along with a scheduling window parameter specifying the period of applicability, as shown at block 330. As noted earlier, this scheduling window parameter may specify a period of time, a number of transmission intervals, or the like. In the event that the period of applicability expires before a new SPV is received, mobile terminals in some embodiments may simply revert to a default scheduling procedure or default SPV.

In some systems, SPVs may be updated for a particular mobile terminal or group of mobile terminals at a particular frequency, and transmitted at that frequency. The updates to the SPVs may account for changes in uplink data needs for one or more mobile terminals, a change in the number of terminals served by the base station, a change in quality-of-service requirements for one or more mobile terminals, or the like. In some systems, the update frequency may be fixed at a pre-determined rate. In others, the update frequency may change as a function of system conditions, such as the loading of the cell, or the quality-of-service requirements of the served terminals.

As suggested earlier, the SPVs provide a means for a resource allocation entity in the wireless network to trade off system utilization and the collision probabilities, with high precision and high flexibility. Different scheduling policies can be applied to different types of traffic, such as traffic having differing quality-of-service (QoS) requirements. For example, for non-guaranteed-bit-rate traffic, a base station can select a SPV that pushes toward a higher probability of the target mobile terminal being silent, e.g., by setting a higher value for the scheduling element corresponding to zero resources. For services provided on a "best effort" basis, the base station may temporarily provide that certain mobile terminals are completely shut down for a short period of time. Other mobile terminals requiring a guaranteed bit-rate may be provided essentially guaranteed resources, for example by providing an SPV like that described in FIG. 2A.

Those skilled in the art will appreciate that the frequency of SPV redistribution can be made high, in which case the performance of the semi-distributed scheduling solution described herein begins to approach that of the traditional centralized scheduler, with the concomitant high overhead and precise control of collisions. Alternatively, SPV redistribution may be relatively infrequent, in which case the performance of the hybrid system may approach that of a classical ALOHA system.

Generally, the distribution of the SPV to mobile terminals is analogous to the distribution of uplink scheduling grants to mobile terminals in a conventional LTE system. Indeed, the SPV can itself be considered as a form of scheduling grant. Accordingly, similar downlink control signaling can be used to distribute the specific SPVs as are currently specified in LTE for sending uplink scheduling grants. In LTE systems, such signaling is conveyed by the Physical Downlink Control Channel (PDCCH). In other systems, corresponding control channels and signaling schemes may be used, according to well-known techniques, to transmit the scheduling policy vectors to one or more target mobile terminals. These control channels may include broadcast as well as dedicated control channels.

In the process of generating an SPV, a resource allocation unit 130 of a base station 110 may receive an input indicating a target collision rate for uplink transmissions. This input may be used by the resource allocation unit 130 in determining an SPV. In other embodiments, various data characterizing loading conditions at the base station, the number of mobile terminals QoS requirements for one or more served mobile terminals, and the like, may also be used in determining an SPV.

As noted above, since mobile terminals make autonomous scheduling decisions, particularly with regards to which resource units to use in a given transmission interval, a possibility remains for most scheduling policies according to the present invention that transmissions may collide, meaning that the same frequency and time resources are used by multiple served mobile terminals. In some embodiments, the base station's resource allocation unit 130 can assess these probabilities and determine the SPVs accordingly. As discussed above, the SPV provides a means to balance the trade-off between high resource utilization (which is most readily achieved with high frequency of scheduling) and collision probabilities between mobile station transmissions.

Figure 4:
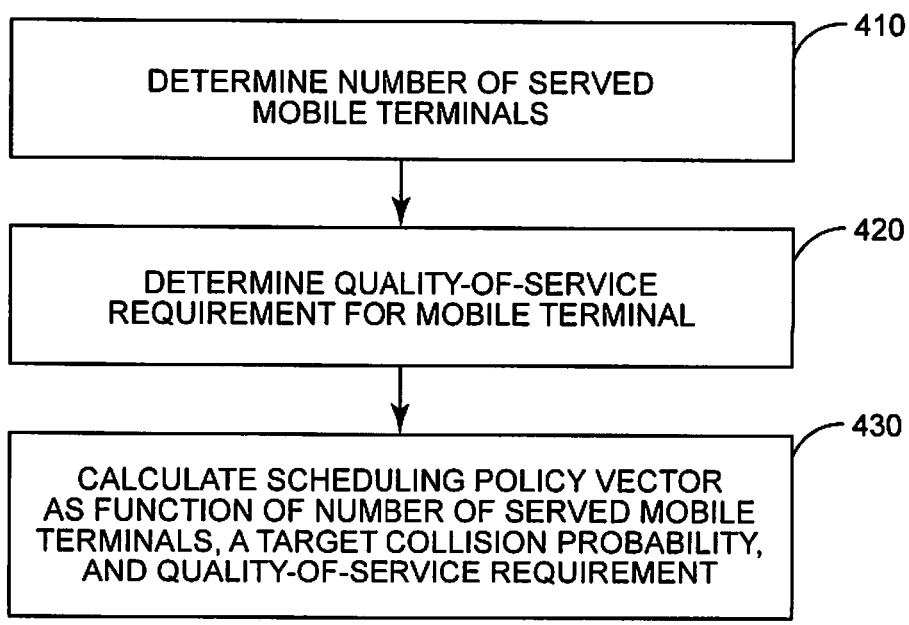
FIG. 4 is a logic flow diagram illustrating an exemplary method for generating a scheduling policy vector according to some embodiments of the invention.

FIG. 4 is a process flow diagram illustrating a general method for determining a scheduling policy vector, using some of the input data discussed above. At block 410, the number of mobile terminals served by a base station is determined. The number of served mobile terminals, as well as the quality-of-service requirements for each terminal, are in many systems the most significant determinants of the scheduling policy. Thus, a quality-of-service requirement for each mobile terminal is also determined, as shown at block 420. The quality-of-service requirement may include, for instance, one or more rate-related requirements such as a peak throughput requirement, an average throughput requirement, or a minimum throughput requirement, and/or one or more latency-oriented requirements, such as a maximum delay requirement, or an indicator that best efforts are sufficient.

At block 430, a scheduling policy vector is calculated, based on the number of served mobile terminals, at least one quality-of-service requirement, and a target collision probability. Those skilled in the art will recognize that in some embodiments the target collision probability in turn may be a function of the aggregate data requirements for all served mobile terminals, the quality-of-service requirement for one or more of the mobile terminals, or both. As noted earlier, a particular scheduling policy may be selected as a function of the quality-of-service requirements for a particular mobile terminal, in order to best ensure that those quality requirements are met, while maintaining efficient use of the spectrum. Thus, for example, a balance may be struck between a dedicated-channel-like policy, in which one or more mobile terminals are guaranteed scheduled resources in a particular interval, and a TDMA-like scheduling policy, where one or more mobile terminals share the resource in a time-division, round-robin fashion. At any point between these extreme policies, the collision probability may be maintained at an arbitrary target point. For intervals where the resources are insufficient to meet the requests, one or more terminals may be restricted entirely from transmitting (e.g., using an SPV with a value of "1" corresponding to a quantity of zero resources), or probabilistically discouraged from transmitting frequently (e.g., using an SPV with a relatively high value at the zero-resources position).

Figure 5:
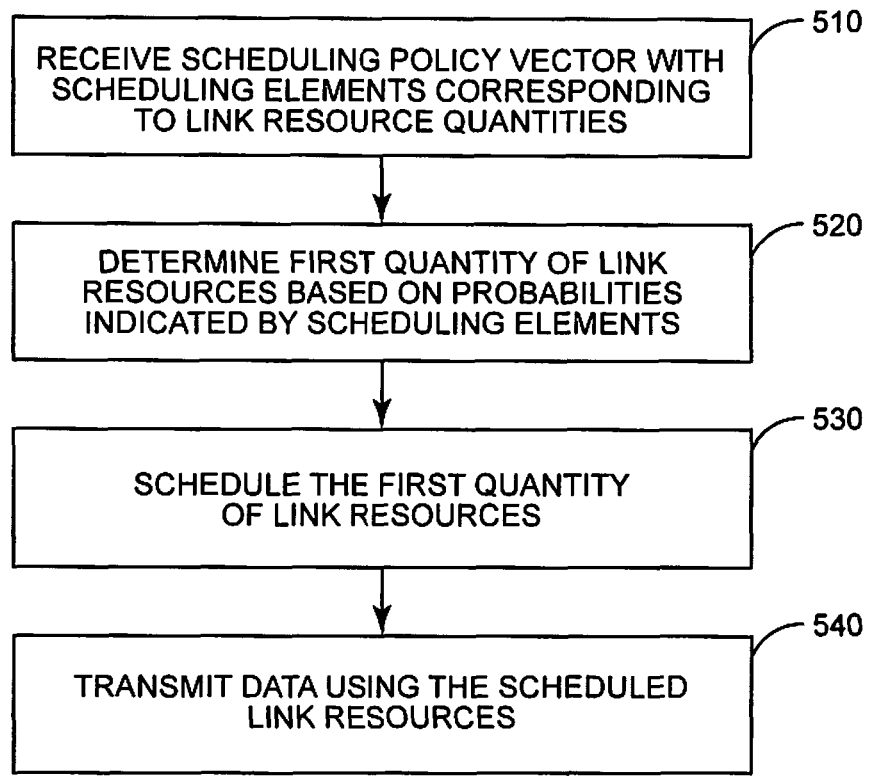
FIG. 5 is a logic flow diagram illustrating an exemplary method for scheduling link resources in a mobile terminal.

FIG. 5 is a process flow diagram depicting a method for scheduling link resources in a wireless communication system that uses a scheduling policy vector as generally described above. The process illustrated in FIG. 5 may be implemented in a wireless handset or other mobile terminal.

The process of FIG. 5 begins with the reception of a scheduling policy vector, as shown at block 510. The scheduling policy vector, as was described in some detail above, includes a plurality of scheduling elements, each element prescribing a probability of use for a corresponding quantity of link resources in a at least a first transmission time interval. In an LTE system or other OFDMA system, for example, the scheduling elements may correspond to a quantity of resource blocks or sub-carriers.

At block 520, the probabilities indicated by the scheduling vectors are used to determine a first quantity of link resources to be scheduled for a first transmission interval. Those skilled in the art will be familiar with a variety of techniques for using the probability weights of the SPV to randomly determine a resource quantity value. For instance, in some embodiments the resource quantities associated with the non-zero values of the SPV may be mapped, in order, to the domain [0,1]. A random number is then used to generate a random number in that same domain. The resource quantity associated with the portion of the domain in which the random number falls is used in the subsequent scheduling of resources. A numerical example may be illustrated with reference to the SPV pictured in FIG. 2C. As discussed above, SPV 210C has a value of 0.625 associated with zero resource units, a value of 0.125 associated with ten resource units, and a value of 0.25 associated with eleven resource units. Thus, if a randomly selected number R from zero to 1 is less than 0.625, then zero units are scheduled. If $0.625 \leq R < 0.750$, then ten resource units. If $R \geq 0.750$, then eleven units are scheduled. Of course, any of a variety of conventional techniques may be used in selecting an appropriate quantity of resource units based on the probabilities supplied by the SPV.

In any event, once the quantity of resource units is determined, a corresponding quantity of link resources is scheduled, as shown at block 530. User data is encoded, modulated, and transmitted to the base station, using the scheduled resources, as shown at block 540.

The techniques described above allow a mobile terminal to select a certain number of channels for transmission to fulfill its QoS requirements, using an SPV. The SPVs discussed above, however, do not dictate which particular channels to use. In some embodiments, a mobile terminal can use channel-dependent (opportunistic) scheduling. Because rapid feedback of uplink channel conditions is often impractical, opportunistic scheduling is most useful in an environment where uplink and downlink radio conditions—in terms of fast fading and channel quality—are correlated, or, in other words, in environments where channel reciprocity may be exploited. This is typically the case in time-division duplex (TDD) systems, and may be possible in frequency-division duplex (FDD) systems, in low channel-dispersive environments. For instance, in large cells the channel dispersion is typically very small.

However, even in state-of-the-art systems channel dependent uplink scheduling is cumbersome and is therefore rarely used. One reason is that for optimal performance mobile terminals should transmit pilots over the entire frequency bandwidth. Furthermore, to properly track the fast channel variations, these pilots should not be power controlled. As a result, in systems such as WCDMA, the uplink scheduling transmission) is not channel dependent. Nevertheless, opportunistic scheduling, even if at only a coarse level, may be practical in some systems. An exemplary method for opportunistic scheduling of uplink resources is pictured in the process flow diagram of FIG. 6. This method, and variations thereof, may be used in combination with one or more of the techniques described herein for selecting a quantity of link resources to be scheduled.

Figure 6:
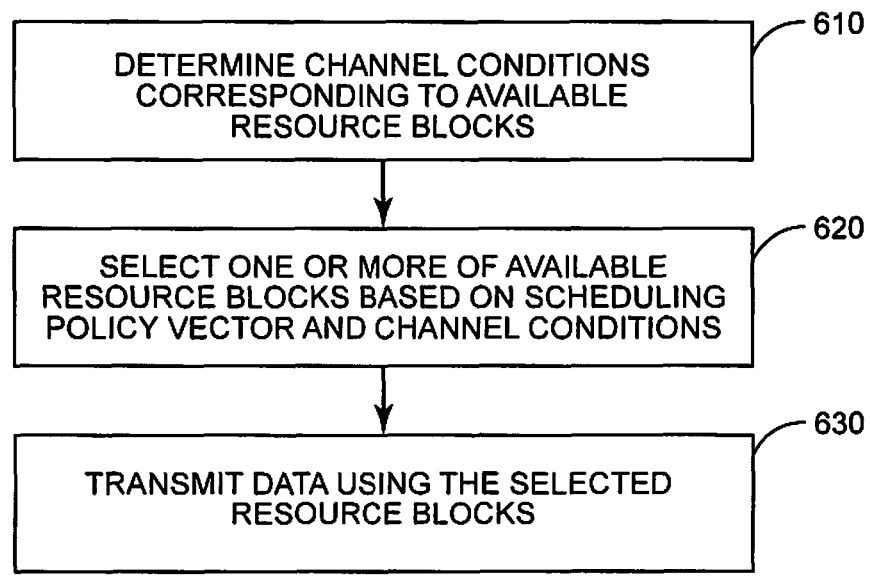
FIG. 6 is another logic flow diagram illustrating a method for selecting resource blocks for scheduling, based on a scheduling policy vector and channel conditions for the resource blocks.

The method pictured in FIG. 6 begins with the determination of channel conditions corresponding to available resources. In an LTE system, these available resources are resource blocks, corresponding to twelve adjacent sub-carriers. As discussed above, the uplink channel conditions may be determined by actual measurements, based on pilot symbols transmitted by the mobile terminal. However, as noted above, this approach may be too cumbersome in some applications, particularly since the results of the measurements must be fed back to the mobile terminal to be used in the opportunistic schedule. Another approach, which may be especially useful in TDD systems, is to exploit the reciprocity of the uplink and downlink channel conditions, and to determine the uplink channel conditions for one or more resource blocks based on the observed channel conditions for corresponding downlink resources.

The channel conditions are used, along with the scheduling policy vector, to select one or more available uplink resources, as shown in FIG. 620. Data is then transmitted, using the selected blocks, as shown at block 630. The quantity of resource blocks may be determined using the probability data included in the SPV, while the particular resources to use are selected based on the corresponding channel conditions. Various approaches to selecting the particular resources may be used. For example, in some embodiments the resources having the "best" channel conditions (e.g., the largest channel coefficients) may be selected. In others, any group of resources meeting a certain minimum quality may be selected. In some systems, such as those utilizing SC-FDMA for uplink transmissions, the selected resource blocks must be contiguous. In these systems, the determination of which particular resource blocks to use may require determining which group of adjacent resource blocks, of the appropriate size, will provide the "best" channel conditions, where "best" may be assessed in terms of the minimum quality for any sub-carrier in the group, the average quality for sub-carriers in the group, or the like.

Those skilled in the art will appreciate that the use of SPVs does not preclude the use of uplink power control. This means that closed-loop power control (slow or fast) may still be employed, using any state-of-the-art methods such as the methods currently prescribed for E-UTRA. Another possibility is to employ other state-of-the-art techniques. For instance, a mobile may perform open-loop power control (e.g., based on downlink path loss estimation) for an initial transmission or for a first transmission after a long idle period, and make use of received ACK/NACK or any other piggy-backed information to improve uplink transmit power accuracy for subsequent transmissions.

Since mobile terminals in many systems can detect collisions by state-of-the-art collision-detection mechanisms (specific collision-detection mechanisms are outside the scope of the present discussion; those skilled in the art will be familiar with several possible collision-detection techniques), the mobile terminal can be configured to adapt to traffic load fluctuations, as explained in more detail below.

Generally, the collision probability will increase when new users are admitted to a cell. On the other hand, the collision probability will generally decrease if active users leave the system. If there is a large fluctuation in traffic load, the base station can respond by updating the SPV. In some embodiments of the present invention, a mobile terminal is allowed to adjust its resource usage autonomously, in the event of small variations in traffic load that affect the collision probabilities. In some of these embodiments, the scheduling policy vector distributed by the base station may include a range, rather than a specific value, for one or more values of the SPV. The range or ranges in the SPV indicate to the mobile terminal that it may autonomously increase or decrease its own scheduling probability up to an upper or lower bound, if it successfully scheduled itself in recent transmission time intervals. This approach significantly reduces the downlink signaling overhead, since on the average the base stations will have to only occasionally update the SPV vector.

In addition to collisions, adverse radio conditions and inadequate transmission power level may also lead to loss of data packets or erroneous reception of mobile terminal transmissions. The overall consequences will be reflected in terms of negative acknowledgements (NACKs) received by the UE and/or missed ACK/NACK detection experienced by the mobile terminal. In some embodiments, the mobile terminal can therefore adjust its scheduling probability, within the boundaries set by the network, based on the HARQ performance.

Since mobile terminals autonomously determine the number of resources and the particular resources to be used in an uplink transmission, the base station should be able to blindly detect these transmissions and demodulate the channels from all of the mobile terminals served by the base station. Those skilled in the art will appreciate that various techniques may be used for blind detection, and to map data received on multiple uplink channels to the appropriate mobile terminals. For instance, a mobile terminal identifier, along with other relevant information, such as modulation type, transport format, and the like, can be encoded in a control channel associated with or pointing to the data channels used by a particular mobile terminal. In some embodiments, the control channel may have a fixed transport format, known to the base station, in which case the base station can blindly detect the control channel and retrieve the mobile terminal data from the corresponding data channels. In other systems, a mobile terminal identifier and other pieces of control information may be embedded in the data channels which are transmitted with one or more of a limited number of possible transport formats. In systems using this latter approach, which is essentially a form of inband signaling, the base station may determine the transport format of the data channels through experimentation, and then derive the mobile terminal identify from the in-channel information.

As discussed above, in some embodiments the SPV for a given user specifies the probabilities that a particular user can take a certain number of resources, such as LTE resource blocks, into use during a specific time interval. In these embodiments, the SPV does not prescribe which resource blocks a mobile terminal should prefer when selecting a subset of the available resource blocks. One refinement of the SPV-based techniques discussed above may include the addition of a second vector that specifies relative probabilities with which the mobile terminal should select a specific resource block. This resource unit probability vector, or RUPV, may be used to provide a bias toward certain resource units for a given mobile terminal, or to completely prohibit the use of certain units. The joint use of the SPV and RUPV allows for a fine granularity of control without requiring detailed scheduling at a centralized control entity. For instance, by means of the RUPV a specific mobile terminal, such as a mobile terminal at the cell edge, may be restricted to a subset of the resource blocks. In this manner, frequency domain inter-cell interference coordination becomes possible.

Figure 7A:
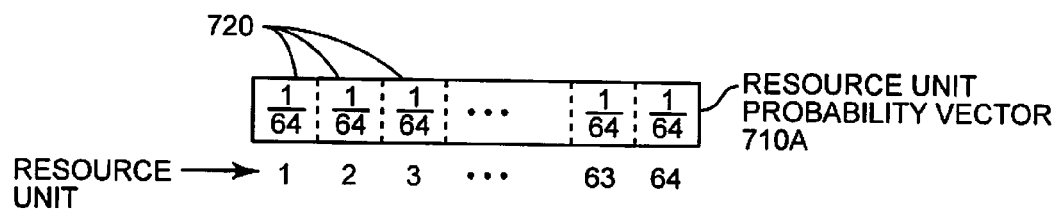
FIGS. 7A-7B illustrate examples of a resource unit probability vector according to some embodiments of the invention.
Figure 7B:
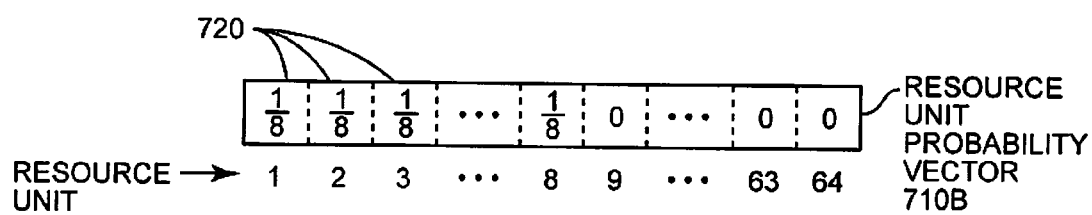

FIGS. 7A and 7B illustrate examples of resource unit probability vectors according to some embodiments of the invention. Those skilled in the art will appreciate, however, that various formats and configurations may be used for generating resource unit probability vectors and transmitting the vectors to one or more mobile terminals.

FIG. 7A depicts a resource unit probability vector 710A designed to facilitate an even distribution of uplink resource by the scheduling mobile terminal over multiple transmissions. In this example, RUPV 710A includes 64 resource elements 720, each of which corresponds to a particular resource unit. Each of the resource elements is set to a value of 1/64, prescribing the relative probability of use for the corresponding resource unit. After transmission to the mobile terminal, the mobile terminal uses the RUPV to select particular resource elements for scheduling transmissions. In this case, all resource units are equally likely to be selected.

FIG. 7B illustrates a second example, in which RUPV 710B is used to bias resource unit selection towards a particular group of resource units, while prohibiting altogether the use of a second group. In FIG. 7B, eight of the resource elements have a value of 1/8, indicating that each of the corresponding resource units should be selected according to a relative probability of 0.125. The remaining 56 elements all have a value of zero, indicating that the corresponding resource units should not be selected at all.

Figure 8:
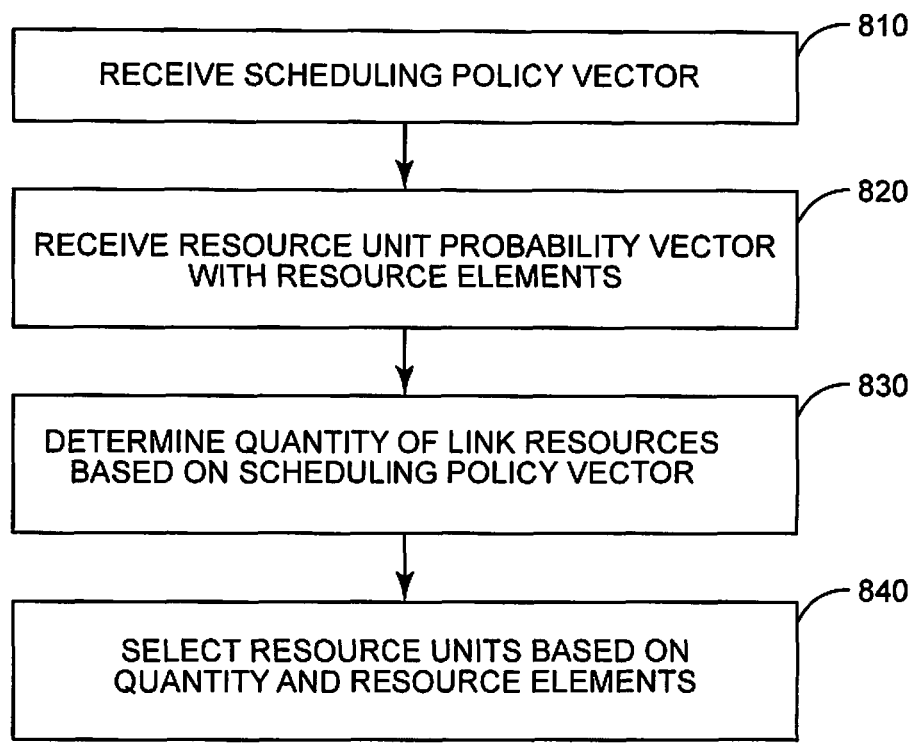
FIG. 8 is an exemplary method for selecting resource units for scheduling, based on a resource unit probability vector.

FIG. 8 is a process flow diagram illustrating an exemplary method, according to some embodiments of the invention, for scheduling resource units based on both a scheduling policy vector and a resource unit probability vector. At block 810, the scheduling policy vector is received by a mobile handset or other mobile terminal. Similarly, a resource unit probability vector is received, as indicated at block 820. As discussed above, the resource unit probability vector includes a plurality of resource elements, each resource element prescribing a relative probability of use for a corresponding link resource unit. As shown at block 830, the mobile terminal determines a quantity of link resources, e.g. LTE resource blocks, for scheduling, based on the scheduling policy vector. The selection of particular resource units is performed based on this quantity, as well as on the resource elements of the resource unit probability vector. A single SPV and/or RUPV may be used for multiple scheduling events, e.g., for scheduling each of several transmission time intervals. Thus, the quantity of resources used in each interval may or may not change, depending on the SPV values. Whether or not the quantity of resources changes from one interval to the next, the particular resources may change, depending on the resource element values.

From the above discussion, it should be clear to those skilled in the art that the SPV may be used to determine the long-term average quantity of resource units that a mobile terminal or group of mobile terminals use for data transmission. The SPV thereby has a direct impact on the average bit-rate of the user data. Likewise, the RUPV controls the degree of freedom with which the mobile can perform scheduling, which may in some embodiments be frequency selective, or opportunistic, which has an impact on the average SINR of the scheduled resource blocks. Thus, joint use of the SPV and the RUPV allows the base station tremendous flexibility in controlling the individual QoS that each mobile receives.

In prior art systems, a commonly associated parameter set with the random access channel consists of the so called persistent value and the backoff timer. The former specifies the probability with which a mobile station should attempt access to the medium, while the latter specifies a duration (e.g. in terms of transmission time intervals) during which the mobile should refrain from re-attempting medium access upon collision.

In a system in accordance with the present invention, the notion of "collision" means that any of the scheduled resource blocks have suffered collision. For instance, if a mobile terminal attempts to send four resource blocks, the number of colliding resource blocks may be any number between zero and four. The actual number is correlated with the load in the system. Those skilled in the art will appreciate that the techniques disclosed herein allow even greater flexibility in determining effective persistence values and backoff timers, as a function of the experienced collisions.

Figure 9:
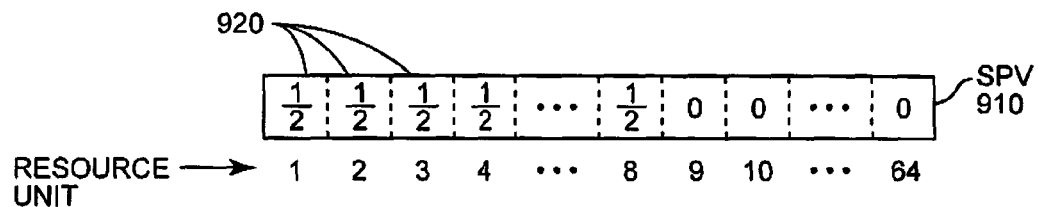
FIG. 9 illustrates another example of a scheduling policy vector according to some embodiments of the invention.

In another refinement of the SPV-based techniques discussed, a single SPV is used to specify absolute probabilities of use for individual link resource units. An exemplary SPV 910 of this type is pictured in FIG. 9, and includes a plurality of scheduling elements 920, each of which specifies an absolute probability of use for the corresponding link resource unit. These scheduling elements may be used by a mobile terminal to select specific link resource units in an appropriate transmission time interval. Those skilled in the art will appreciate that the absolute probabilities in an SPV of this type may be adjusted to regulate the expected number of resource units to be taken into use at any given time, as well as to bias the usage towards a particular subset of all available link resource units. For instance, in the pictured example, each of the first eight link resource units has a 50% probability of being taken into use, while the use of any other link resource units is prohibited. For any given time interval, the expected number of link resource units to be used is four. The actual units used will be distributed among the first eight link resource units.

As discussed above in conjunction with FIGS. 7 and 8, a resource unit probability vector (RUPV) may be used in conjunction with a scheduling policy vector that specifies link resource quantities, to specify the relative probability that a particular resource block is taken into use by a mobile terminal. As discussed in conjunction with FIG. 9, a single scheduling policy vector that specifies absolute probabilities of use for specific link resource units may be used instead. Another approach, according to some embodiments of the invention, is to associate link resource units with a priority value as well as a conditional probability. In this enhanced scheme, a mobile terminal takes into use its respective highest priority link resource unit (or units) with a predefined probability. In addition, the mobile terminal may schedule the next lower priority link resource unit with its predefined conditional probability, given that the mobile terminal has already used the higher priority resource blocks. This scheme allows further separation of the mobile terminals in the frequency domain, and consequently reduces collision probabilities. Effectively, this general (extended) scheme allows the eNodeB to indicate to a mobile terminal that "You may take into use Resource Block x, but only when you have already used all your other (higher priority) resource blocks."

Figure 10:
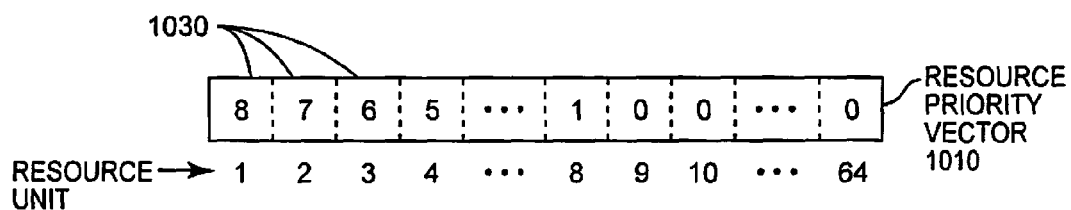
FIG. 10 illustrates an exemplary resource priority vector and a resource unit probability vector.
Figure 10:
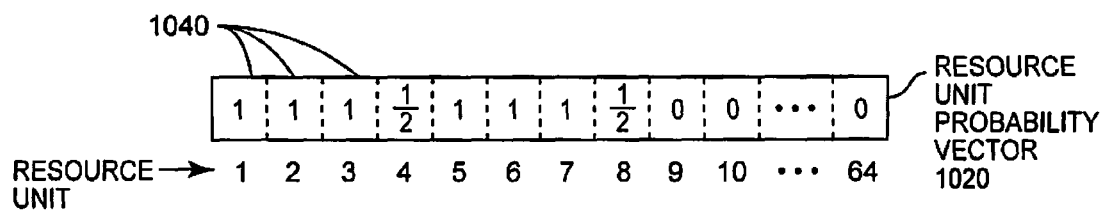

FIG. 10 illustrates an exemplary resource priority vector 1010 and a corresponding resource unit probability vector 1020. The latter may be regarded as a particular type of scheduling policy vector, as each of its resource probability elements 1040 specifies a probability that a corresponding link resource unit is taken into use. However, in this case the indicated probabilities are conditional probabilities, specifying a probability that a given link resource unit is used given that all higher priority link resource units have already been used. In the pictured example, link resource units numbered 8 through 1 have corresponding priorities of 1 to 8, respectively. The remaining resource units have been assigned priority elements 1040 with a value of "0", which may be used in some embodiments to indicate that the corresponding unit should not be used at all. Each of the resource units with a defined priority also has a corresponding probability element 1040 in vector 1020. Resource unit 8, with a priority value of "1", has a probability value of ½, indicating a 50% probability of use for a given transmission time interval. Resource units 5, 6, and 7, with the next highest priorities, have conditional probabilities of 1, indicating that they should always be used if resource unit 8 is used. The next highest priority unit, however, which is resource unit 4, has a conditional probability of ½, indicating that it scheduled with a probability of 50%, given that units 5-8 have already been scheduled. Resource units 1-3 have probability elements 1040 with value "1", indicating that they should always be used if resource unit is used.

Those skilled in the art will appreciate that repeated use of the vectors 1010 and 1020 will generate an average usage of three resource units, with zero units scheduled one-half of the time, four units scheduled one-fourth of the time, and eight units scheduled one-fourth of the time. Of course, much more complex combinations of prioritization and conditional probabilities may be used to finely tune access probabilities for individual mobile terminals while efficiently managing system throughput. In some embodiments, priorities for each specific link resource unit may be specified by the resource priority elements 1030 of a resource priority vector 1010, which may be transmitted to the mobile station for use along with the resource unit probability vector 1020. Those skilled in the art will appreciate that the resource priority vector 1010 may be transmitted less frequently than the resource unit probability vector 1020 in some embodiments, reducing signaling overhead while retaining a great deal of scheduling flexibility.

In various embodiments of the present invention, a mobile terminal is controlled to randomly access an arbitrary portion of the overall common resource (that is the pool of resource blocks), allowing multiple terminals to transmit at the same time without having (necessarily) a collision. In fact, the various scheduling policy vectors and/or resource unit probability vectors and/or resource priority vectors disclosed herein may be employed in such a manner as to guarantee no collision between any two (or any subset) of mobile terminals, by only allowing access to certain resource blocks. Alternatively, these vectors may be used together to fine-tune the collision probabilities (rather than completely eliminating them), improving system throughput at the expense of occasional collisions. Various embodiments of the present invention derive the SPV and the RUPV from user plane QoS requirements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of allocating link resources in a wireless communications system, the method comprising:
   generating a first scheduling policy vector comprising a plurality of scheduling elements, each scheduling element prescribing a probability of use for either a corresponding quantity of link resources or a corresponding link resource unit; and
   transmitting the first scheduling policy vector to a mobile terminal for use by the mobile terminal in selecting link resource units for scheduling in at least a first transmission time interval.

2. The method of claim 1, further comprising transmitting a scheduling window parameter specifying a period of applicability for the first scheduling policy vector.

3. The method of claim 1, wherein each scheduling element prescribes a probability of use for a corresponding quantity of resource blocks, wherein each resource block comprises two or more Orthogonal Frequency-Division Multiple Access subcarriers.

4. The method of claim 1, wherein generating the first scheduling policy vector comprises determining a number of served mobile terminals and calculating the scheduling elements as a function of the number of served mobile terminals and a target probability for collisions between mobile terminal transmissions.

5. The method of claim 1, wherein generating the first scheduling policy vector comprises calculating the scheduling elements as a function of a quality-of-service requirement for the mobile terminal or a group of mobile terminals.

6. The method of claim 1, further comprising transmitting the first scheduling policy vector to one or more additional mobile terminals.

7. The method of claim 1, wherein the first scheduling policy vector comprises scheduling elements prescribing probabilities of use for corresponding quantities of link resources, the method further comprising:
generating a resource unit probability vector comprising a plurality of resource elements, each resource element prescribing a relative probability of use for a corresponding link resource unit; and
transmitting the resource unit probability vector to the mobile terminal for use with the first scheduling policy vector in selecting a number of link resource units for scheduling and for selecting specific link resource units for scheduling in the first transmission time interval.

8. The method of claim 1, wherein the first scheduling policy vector comprises scheduling elements prescribing an absolute probability of use for a corresponding link resource unit, for use by the mobile terminal in selecting specific link resource units for scheduling in the first transmission time interval.

9. The method of claim 1, wherein the first scheduling vector comprises a resource unit probability vector comprising a plurality of resource probability elements corresponding to link resource units, and the method further comprises:
generating a resource unit priority vector comprising a plurality of resource priority elements corresponding to link resource units; and
transmitting the resource unit priority vector to the mobile terminal for use in scheduling of the link resource units;
wherein each resource priority element prescribes a priority of use for the corresponding link resource unit and wherein one or more of the resource probability elements prescribes a conditional probability that the mobile terminal uses the corresponding link resource unit in the first transmission time interval on the condition that the mobile terminal is also using all higher priority link resource units.

10. The method of claim 1, further comprising:
generating additional scheduling policy vectors for the mobile terminal at a first frequency; and
transmitting the additional scheduling policy vectors to the mobile terminal at the first frequency.

11. The method of claim 10, further comprising determining the first frequency as a function of loading conditions.

12. The method of claim 1, wherein the first scheduling policy vector comprises scheduling elements prescribing probabilities of use for corresponding quantities of link resources and one or more scheduling elements of the first scheduling policy vector prescribe a range of probabilities that the mobile terminal selects the corresponding quantity of link resources in the first transmission time interval and one or more subsequent transmission time intervals.

13. A base station in a wireless communication system, comprising a resource allocation unit and a radio transceiver, wherein the resource allocation unit is configured to:
generate a first scheduling policy vector comprising a plurality of scheduling elements, each scheduling element prescribing a probability of use for either a corresponding quantity of link resources or a corresponding link resource unit; and
transmit the first scheduling policy vector to a mobile terminal, via the radio transceiver, for use by the mobile terminal in selecting link resource units for scheduling in at least a first transmission time interval.

14. The base station of claim 13, wherein the resource allocation unit is further configured to transmit a scheduling window parameter to the mobile terminal, via the radio transceiver, wherein the scheduling window parameter specifies a period of applicability for the first scheduling policy vector.

15. The base station of claim 13, wherein each scheduling element prescribes a probability of use for a corresponding quantity of resource blocks, wherein each resource block comprises two or more OFDMA subcarriers.

16. The base station of claim 13, wherein the resource allocation unit is configured to generate the first scheduling policy vector by determining a number of served mobile terminals and calculating the scheduling elements as a function of the number of served mobile terminals and a target probability for collisions between mobile terminal transmissions.

17. The base station of claim 13, wherein the resource allocation unit is configured to generate the first scheduling policy vector by calculating the scheduling elements as a function of a quality-of-service requirement for the mobile terminal.

18. The base station of claim 13, wherein the resource allocation unit is further configured to transmit the first scheduling policy vector to one or more additional mobile terminals.

19. The base station of claim 13, wherein the first scheduling policy vector comprises scheduling elements prescribing probabilities of use for corresponding quantities of link resources and the resource allocation unit is further configured to:
generate a resource unit probability vector comprising a plurality of resource elements, each resource element prescribing a probability of use for a corresponding link resource unit; and
transmit the resource unit probability vector to the mobile terminal for use with the first scheduling policy vector in selecting a number of link resource units for scheduling and for selecting specific link resource units for scheduling in the first transmission time interval.

20. The base station of claim 13, wherein each of the scheduling elements of the first scheduling vector prescribes an absolute probability of use for a corresponding link resource unit, for use by the mobile terminal in selecting specific link resource units for scheduling in the first transmission time interval.

21. The base station of claim 13, wherein the first scheduling vector comprises a resource unit probability vector comprising a plurality of resource probability elements corresponding to link resource units; and the resource allocation unit is further configured to:
generate a resource unit priority vector comprising a plurality of resource priority elements corresponding to link resource units; and
transmit the resource unit priority vector to the mobile terminal, via the radio transceiver, for use in scheduling of the link resource units;
wherein each resource priority element indicates a priority of use for the corresponding link resource unit and wherein one or more of the resource probability elements indicates a conditional probability that the mobile terminal uses the corresponding link resource unit in the first transmission time interval on the condition that the mobile terminal is also using all higher priority link resource units.

22. The base station of claim 13, wherein the resource allocation unit is further configured to:
generate additional scheduling policy vectors for the mobile terminal at a first frequency; and
transmit the additional scheduling policy vectors to the mobile terminal at the first frequency.

23. The base station of claim 13, wherein the resource allocation unit is further configured to determine the first frequency as a function of loading conditions.

24. The base station of claim 13, wherein one or more of the scheduling elements of the first scheduling policy vector indicate a range of probabilities that the mobile terminal uses the corresponding quantity of link resources in the first transmission time interval and one or more subsequent transmission time intervals.

25. A method in a mobile terminal for scheduling link resources in a wireless communications system, the method comprising:
receiving a scheduling policy vector comprising a plurality of scheduling elements, each scheduling element prescribing a probability of use in at least a first transmission time interval for either a corresponding quantity of link resources or a corresponding link resource unit; and
scheduling one or more link resource units based on the scheduling policy vector.

26. The method of claim 25, wherein the method further comprises transmitting data during the first transmission interval, using the scheduled link resource units.

27. The method of claim 25, wherein the method further comprises:
receiving a scheduling window parameter specifying a period of applicability for the scheduling policy vector; and
determining that the first transmission time interval is within the period of applicability before scheduling the link resource units for the first transmission time interval.

28. The method of claim 25, wherein the scheduling policy vector comprises scheduling elements prescribing a probability of use for corresponding quantities of link resources, and wherein the scheduling of one or more link resource units based on the scheduling policy vector comprises:
determining, based on the scheduling policy vector, a first quantity of link resources for use in the first transmission time interval; and
scheduling the one or more link resource units according to the determined first quantity.

29. The method of claim 28, wherein scheduling the one or more link resource units comprises selecting the one or more link resource units based on channel conditions.

30. The method of claim 28, wherein each scheduling element corresponds to a quantity of resource blocks, wherein each resource block comprises two or more Orthogonal Frequency-Division Multiple Access subcarriers.

31. The method of claim 28, further comprising receiving a resource unit probability vector comprising a plurality of resource elements, each resource element prescribing a relative probability of use for a corresponding link resource unit in the first transmission time interval, and wherein the scheduling of the one or more link resource units according to the determined first quantity comprises selecting the one or more link resource units based on the corresponding resource elements.

32. The method of claim 28, wherein the scheduling policy vector comprises scheduling elements prescribing an absolute probability of use for a corresponding link resource unit, wherein the scheduling of one or more link resource units based on the scheduling policy vector comprises selecting specific link resource units for scheduling based on the scheduling elements.

33. The method of claim 25, wherein the first scheduling vector comprises a resource unit probability vector comprising a plurality of resource probability elements corresponding to link resource units, and the method further comprises receiving a resource unit priority vector comprising a plurality of resource priority elements corresponding to link resource units, wherein each resource priority element indicates a priority of use for the corresponding link resource unit and wherein one or more of the plurality of resource probability elements indicates a conditional probability that the mobile terminal uses the corresponding link resource unit in the first transmission time interval on the condition that the mobile terminal is also using all higher priority link resource units, and wherein the scheduling of one or more link resource units according to the determined first quantity comprises selecting the one or more link resource units based on the corresponding resource priority elements and resource probability elements.

34. The method of claim 25, wherein one or more of the scheduling elements of the scheduling policy vector indicate a range of probabilities that the mobile terminal uses the corresponding quantity of link resources in the first transmission time interval and one or more subsequent transmission time intervals, and wherein the method further comprises determining a second quantity of link resources for use in a second transmission time interval based on the scheduling elements and whether a collision is detected in the first transmission time interval.

35. A mobile terminal for use in a wireless communication system, the mobile terminal comprising a radio transceiver and a scheduling unit, wherein the scheduling unit is configured to:
receive, via the radio transceiver, a scheduling policy vector comprising a plurality of scheduling elements, each scheduling element prescribing a probability of use in at least a first transmission time interval for either a corresponding quantity of link resources or a corresponding link resource unit; and
schedule one or more link resource units based on the scheduling policy vector.

36. The mobile terminal of claim 35, wherein the radio transceiver is configured to transmit data during the first transmission interval, using the one or more scheduled link resource units.

37. The mobile terminal of claim 35, wherein the scheduling unit is further configured to:
receive, via the radio transceiver, a scheduling window parameter specifying a period of applicability for the scheduling policy vector; and
determine that the first transmission time interval is within the period of applicability before scheduling the link resource units for the first transmission time interval.

38. The mobile terminal of claim 35, wherein the scheduling policy vector comprises scheduling elements prescribing a probability of use for corresponding quantities of link resources, and the scheduling unit is configured to schedule one or more link resource units based on the scheduling policy vector by being configured to:

determine, based on the scheduling policy vector, a first quantity of link resources for use in the first transmission time interval; and schedule the one or more link resource units according to the determined first quantity.

39. The mobile terminal of claim 38, wherein the scheduling unit is configured to select the one or more link resource units based on channel conditions.

40. The mobile terminal of claim 38, wherein the scheduling unit is further configured to receive a resource unit probability vector comprising a plurality of resource elements, each resource element prescribing a probability of use for a corresponding link resource unit in the first transmission time interval, and wherein the scheduling unit is configured to select the one or more link resource units based on the corresponding resource elements.

41. The mobile terminal of claim 35, wherein the scheduling policy vector comprises scheduling elements prescribing an absolute probability of use for a corresponding link resource unit, and wherein the scheduling unit is configured to schedule one or more link resource units based on the scheduling policy vector by selecting specific link resource units for scheduling based on the scheduling elements.

42. The mobile terminal of claim 35, wherein the scheduling vector further comprises a resource unit probability vector comprising a plurality of resource probability elements corresponding to link resource units, and the scheduling unit is further configured to receive a resource unit priority vector comprising a plurality of resource priority elements corresponding to link resource units, wherein each resource priority element indicates a priority of use for the corresponding link resource unit and wherein one or more of the resource probability elements indicates a conditional probability that the mobile terminal uses the corresponding link resource unit in the first transmission time interval on the condition that the mobile terminal is also using all higher priority link resource units, and wherein the scheduling unit is configured to select the one or more link resource units based on the corresponding resource priority elements and resource probability elements.

43. The mobile terminal of claim 35, wherein one or more of the scheduling elements of the scheduling policy vector indicate a range of probabilities that the mobile terminal uses the corresponding quantity of link resources in the first transmission time interval and one or more subsequent transmission time intervals, and wherein the scheduling unit is configured to determine a second quantity of link resources for use in a second transmission time interval based on the scheduling elements and whether a collision is detected in the first transmission time interval.

* * * * *